United States Patent [19]

Markey

[11] Patent Number: 5,774,200
[45] Date of Patent: Jun. 30, 1998

[54] CLIP-ON AUXILIARY GLASSES AND METHOD OF MANUFACTURE

[75] Inventor: Ryan N. Markey, Dallas, Tex.

[73] Assignee: Clip Tech, Inc., Dallas, Tex.

[21] Appl. No.: 534,484

[22] Filed: Dec. 8, 1995

[51] Int. Cl.[6] .............................. G02C 7/16; G02C 7/08; G02C 13/00
[52] U.S. Cl. ................................ 351/47; 351/57; 351/83; 351/178
[58] Field of Search ................................. 351/41, 44, 47, 351/57, 142, 148, 149, 150, 158, 178, 83

[56] References Cited

U.S. PATENT DOCUMENTS 2,071,331   2/1937   Callahan .................................. 351/57
5,123,724   6/1992   Salk ........................................ 351/57

FOREIGN PATENT DOCUMENTS

WO95/18987   7/1995   WIPO ..................................... 351/47

*Primary Examiner*—Huy Mai
*Attorney, Agent, or Firm*—Roger C. Clapp

[57] ABSTRACT

Clip-on auxiliary glasses are custom fit to a user's regular eyeglasses by selecting heat-softenable rim blanks having circumferences corresponding to the circumferences of auxiliary lenses, softening them and securing the auxiliary lenses in them. A pair of spaced clips is secured in the periphery of each rim, and a spring bridge strap is cut to length and secured to each rim to produce a unit which matches the configuration of the eyeglasses with which the auxiliary glasses are to be used.

8 Claims, 2 Drawing Sheets

5,774,200

CLIP-ON AUXILIARY GLASSES AND METHOD OF MANUFACTURE

TECHNICAL FIELD OF THE INVENTION

This invention relates to eyeglasses, and more particularly to auxiliary glasses which may be clipped on to a user's regular eyeglasses, and to methods for manufacturing such auxiliary glasses.

BACKGROUND OF THE INVENTION

Clip-on sunglasses have been available to eyeglass users for many decades. Such clip-on auxiliary glasses have often been of a predetermined size and shape, in which case the ability to match the specific configuration of a user's eyeglasses is severely limited. Despite this disadvantage, clip-on eyeglasses have proved to be a popular item enabling eyeglass wearers to adapt to bright sunlit conditions without the necessity of carrying both clear and tinted prescription eyeglasses.

Efforts have been made to provide custom-fit clip-on sunglasses prepared to match a particular user's eyeglass configuration. For example, U.S. Pat. No. 5,123,724 discloses a customized clip-on system in which clasps are adhesively bonded or otherwise attached to auxiliary lens elements following matching of the elements to the lenses of the user's regular eyeglasses. Existing technologies, however, have fallen short of the results achieved by the present invention, which provides a more attractive and durable product while utilizing a manufacturing process which is both simple and economical.

SUMMARY OF THE INVENTION

The present invention contemplates the custom preparation of auxiliary glasses using a rim blank which comprises a heat-softenable rim member having a circumference selected to correspond generally to the circumference of a lens of the user's regular eyeglasses. Means are carried by the rim blank for holding at least two clips at spaced locations around the rim. A receptacle formed on the rim member is adapted to receive a bridge strap for connecting two auxiliary rims with lenses together to form a unit.

A fabrication process in accordance with the present invention begins with the provision of auxiliary lenses generally corresponding in size and shape to the lenses in the eyeglasses. The fabricator then selects a heat-softenable rim blank for each auxiliary lens corresponding in circumference to the circumference of the auxiliary lens. The selected rim blanks are heated to soften them and the auxiliary lenses are secured in the softened rims which are conformed to the periphery of the auxiliary lenses. A pair of clips is fastened to each rim at spaced locations on the rim, and a bridge strap is connected to the rims, the strap having a length selected such that the connected rims correspond in configuration to the user's eyeglasses.

Auxiliary eyeglasses produced in accordance with the invention are attractive, durable and economic. The resulting clip-ons may be flexed to place them securely on the regular eyeglasses providing an excellent match for the user's selected eyeglass configuration.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
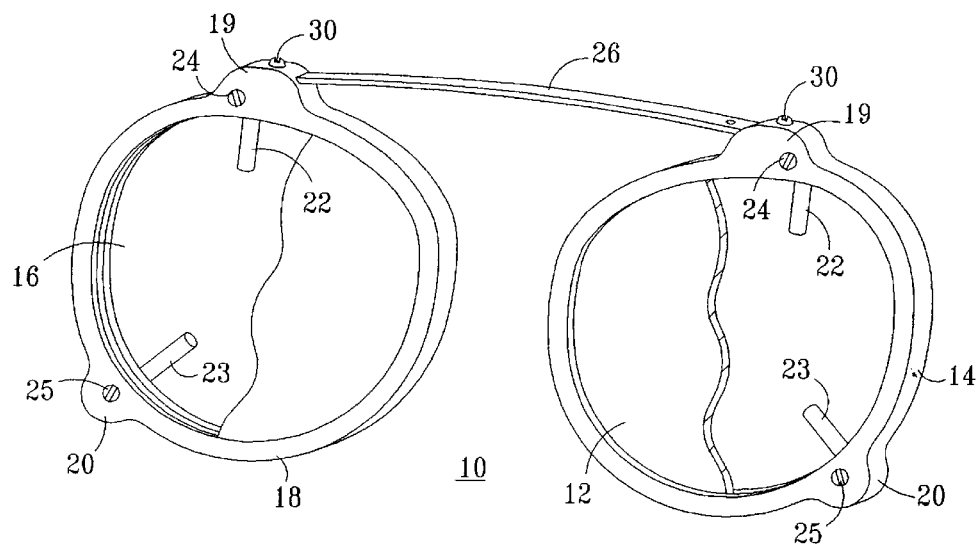
FIG. 1 is a perspective view of auxiliary glasses prepared in accordance with the present invention.

Auxiliary glasses prepared in accordance with this invention are indicated by the reference numeral 10 in FIG. 1. A left auxiliary lens 12 is held in a left rim 14. A right auxiliary lens 16 is held in right rim 18. In a typical application, the auxiliary lenses will simply be tinted in the manner of sunglasses so that the auxiliary glasses may be employed with the regular eyeglasses of the user under conditions of bright light. Other applications of the invention may be made as well. For example, the lenses 12 and 16 may be of a selected magnifying characteristic for use in reading.

Each rim 14 and 18 is formed with an upper clip boss 19 and a lower clip boss 20. An upper clip 22 is secured in each upper clip boss 19 by a screw 24, and a lower clip 23 is secured in each lower clip boss 20 by a screw 25. A spring bridge strap 26 connects the rims 14 and 18 into a single unit. The bridge strap 26 fits in a receptacle slot 28 formed in the upper clip boss 18 of each rim, and is secured in place by a screw 30 threaded through the strap and into each rim.

Figure 2:
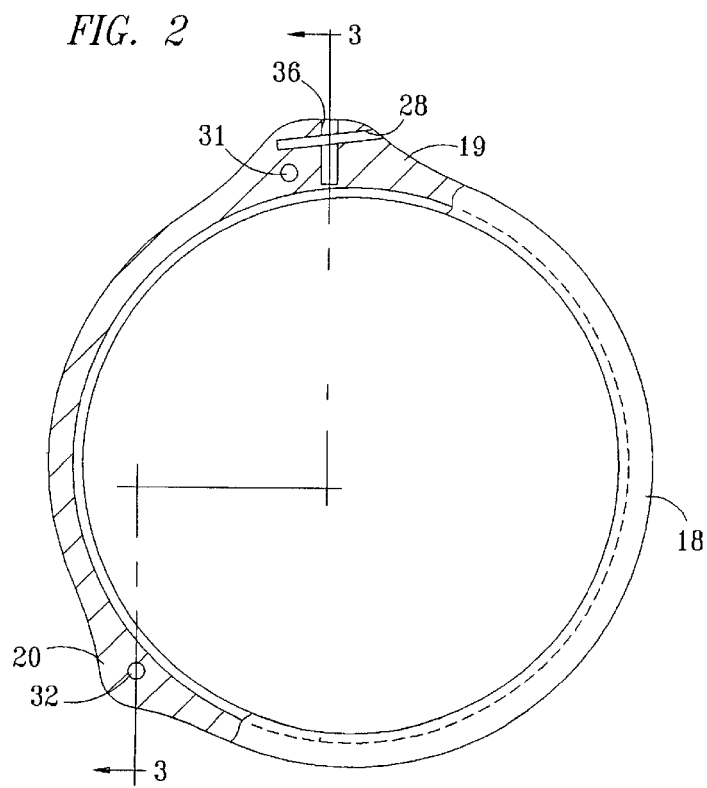
FIG. 2 is a front view of a rim blank of the present invention which can be used as a starting point for the preparation of the auxiliary glasses of FIG.1.
Figure 3:
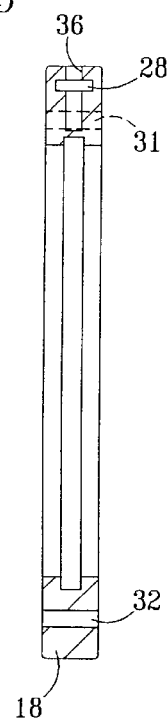
FIG. 3 is a cross-section taken along the line 3—3 in FIG. 1.

The auxiliary glasses 10 are custom fabricated to match the specific eyeglass configuration of the intended user. This is accomplished by providing each rim 14 and 18 in the form of a heat-softenable rim blank, a representative one of which is depicted in FIGS. 2 and 3. The elements needed to accompany the rim blanks are depicted in FIGS. 4 and 5, which illustrates a bridge strap blank, and FIG. 6, which illustrates one of the clip attachments to the rim.

The rim blank of FIGS. 2 and 3 is formed from a heat-softenable material, which may be shaped to conform to the circumference of the desired auxiliary lens upon heating. Materials suitable for the blank include thermoplastics and metals. One suitable material is a cellulose acetate, which after mild heating may readily receive and be shaped to hold the auxiliary lens. The rim blanks may be provided in a shape which approximates the most popular lens shapes, although the precise shape is not crucial since the rim blank will be conformed to the auxiliary lens. The circular shape depicted in FIG. 2 is a satisfactory form for the rim blank. It is necessary, for the orderly fabrication of auxiliary glasses on a custom basis, to maintain a stock of the rim blanks in various circumferences, as will be seen below.

As seen in FIG. 2, the upper clip boss 19 is provided with a through hole 31 for receiving and securing a clip 22. Similarly hole 32 is provided in the lower clip boss 20 to accommodate a lower clip 23. The upper clip boss 18 is formed with a strap receptacle slot 28, which is intersected by a hole 36 for receiving screw 30.

Figure 4:
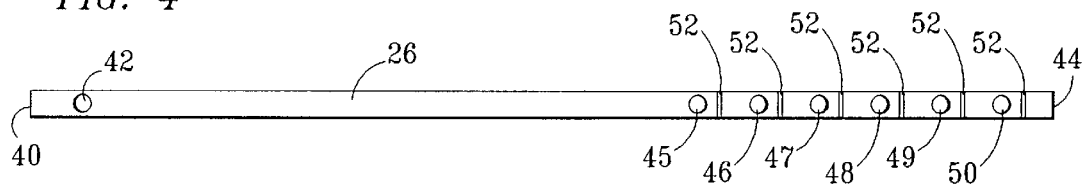
FIG. 4 is a plan view of a bridge strap blank used to prepare the auxiliary glasses of FIG. 1.
Figure 5:
FIG. 5 is a side view of the bridge strap blank of FIG. 4.
Figure 6:
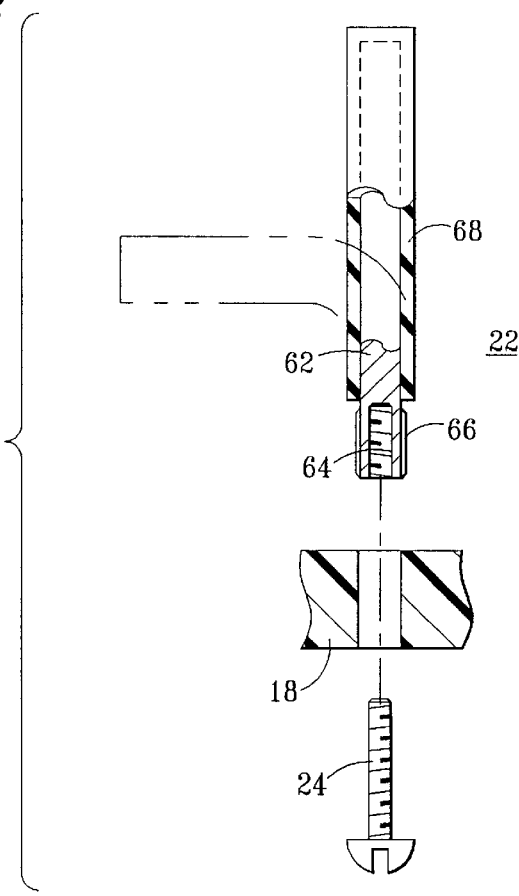
FIG. 6 is a top view, partially in section, illustrating the attachment of one of the clips in an auxiliary rim in accordance with the invention.

A bridge strap blank for forming strap 26 is seen in FIGS. 4 and 5. A first end 40 of the strap blank is provided with a threaded hole 42. The opposite end 44 of the strap blank has six spaced threaded holes 45–50. A score line 52 is formed outboard of each of the holes 45–50, to facilitate ready shortening of the strap blank. The strap blank is formed from a thin springy material such as a spring tension steel. As seen in FIG. 5, the blank may be formed with a slight curvature.

Each of the upper and lower clips 22 and 23 is identically formed as indicated in FIG. 5. Clip 22 as indicated in that figure is formed by a small diameter metal tube 62 into which a hole 64 is sunk at one end thereof. Anchoring knurls 66 may be formed on the outside of tube 62 at the end with hole 64. A soft cover 68 is fit over the opposite end of tube 62 to protect the eyeglasses from damage. A conventional shrink tube used in eyeglass clips may be used for this purpose.

The auxiliary glasses of FIG. 1 may be custom formed utilizing the starting materials of FIGS. 2–6 in a process which is quick and economical to perform. The auxiliary lenses are cut to approximate the size and shape of the user's regular eyeglasses. The circumference of the auxiliary lenses is measured using a conventional circumference gauge. A pair of rim blanks are selected having a circumference corresponding to the measured circumference of the auxiliary lenses. The blanks are heated to soften them, and the auxiliary lenses are secured in the rims and the rims conformed to the periphery of the lenses. Prior to the heating step the clips 22 and 23 may be placed in the holes 31 and 32, and loosely held in place by screws 24 and 25. Following placement of the auxiliary lenses, the clips are securely fastened in place by tightening the screws 24 and 25. Tubing 68 is then placed over the clips and shrunk into place. The strap blank of FIG. 4 is placed into one of the rim slot receptacles 28 and secured in place by a screw 30. The desired length of the strap 26 may then be determined by placing end 44 of the strap blank on the other rim and securing it loosely in position atop the upper clip boss 18 of said other rim. The hole is selected which gives the best spacing of the two lenses to match the user's regular eyeglasses. The strap blank may then be trimmed at one of the score lines 52 and the end 44 of the strap blank secured in receptacle slot 28 by screw 30. Finally, the clips 22 and 23 are bent as indicated in phantom in FIG. 5, and trimmed to a desired length. The finished auxiliary glasses may be flexed to secure them onto the user's regular eyeglasses, where the spaced clips will hold them in position to match the configuration of the eyeglasses.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method of preparing clip-on auxiliary eyeglasses for a pair of eyeglasses having a frame holding two lenses, comprising:
   (a) maintaining a stock of separate components comprising auxiliary lenses of various shapes, heat-softenable auxiliary rims of various circumferences, clips and bridge straps;
   (b) selecting auxiliary lenses from the stock of auxiliary lenses so that the selected auxiliary lenses generally correspond in shape to the shape of the lenses in the eyeglasses;
   (c) selecting a heat-softenable rim from the stock of heat-softenable rims for each auxiliary lens corresponding in circumference to the circumference of the auxiliary lens;
   (d) heating the selected rims to soften them;
   (e) securing the selected auxiliary lens in the softened rims;
   (f) fastening a pair of clips from the stock of clips at spaced locations on each rim; and
   (g) securing a strap connecting the rims, the strap having a length selected such that the connected rims correspond in configuration to the eyeglasses.

2. The method of claim 1 wherein each clip of the pair of clips is fastened to a rim by inserting a thin tube in the rim, sheathing it in a soft cover, bending the tube and trimming the tube.

3. The method of claim 1, wherein the strap is secured to the rims by placing the strap into a slot in each rim and fastening it with a threaded member.

4. The method of claim 3, including the further step of trimming the strap to a length adapted to conform the auxiliary glasses to the configuration of the eyeglasses prior to securing the strap to the rims.

5. A rim blank for preparation of auxiliary clip-on glasses for a pair of eyeglasses comprising:
   (a) a heat-softenable rim member having a preselected circumference;
   (b) means carried by the rim member for holding at least two clips in spaced locations around the rim member; and
   (c) a receptacle formed by the rim member for receiving a bridge strap.

6. The blank of claim 5, wherein the receptacle for receiving a bridge strap comprises a slot formed in the upper portion of the rim blank, which slot is intersected by a hole for receiving a fastening threaded member.

7. The blank of claim 5, wherein the means for holding clips comprises through holes in the rim member spaced about the circumference of the rim member by more than 90 degrees, and less than 180 degrees, of separation.

8. Clip-on auxiliary glasses for use with a pair of eyeglasses comprising:
   (a) a first auxiliary lens secured in a first rim by softening the first rim through the application of heat and conforming the softened first rim to the periphery of the first auxiliary lens;
   (b) a second auxiliary lens secured in a second rim by softening the second rim through the application of heat and conforming the softened second rim to the periphery of the second auxiliary lens;
   (c) a first pair of clips carried by the first rim circumferentially spaced locations thereon;
   (d) a second pair of clips carried by the second rim at circumferentially spaced locations thereon; and
   (e) a spring strap bridging the first and second rims to produce auxiliary glasses capable of being secured to the eyeglasses by flexing to cause the clips to hold the auxiliary glasses in place.

* * * * *

UNITED STATES PATENT AND TRADEMARK OFFICE
CERTIFICATE OF CORRECTION

PATENT NO. : 5,774,200
DATED : June 30, 1998
INVENTOR(S) : Ryan N. Markey

It is certified that error appears in the above-indentified patent and that said Letters Patent is hereby corrected as shown below:

Claim 2 (column 4, line 15), the words "claim I" should read "claim 1."

Claim 8(c) (column 4, line 55), the second line should read "entially at spaced locations thereon;".

Signed and Sealed this

Fifth Day of January, 1999

*Attest:*

*Attesting Officer*

*Acting Commissioner of Patents and Trademarks*